United States Patent [19]

Endou et al.

[11] Patent Number: 4,571,331
[45] Date of Patent: Feb. 18, 1986

[54] ULTRAFINE POWDER OF SILICON CARBIDE, A METHOD FOR THE PREPARATION THEREOF AND A SINTERED BODY THEREFROM

[75] Inventors: Morinobu Endou, Nagano; Minoru Takamizawa, Tokyo; Tatsuhiko Hongu, Kanagawa; Taishi Kobayashi; Akira Hayashida, both of Niigata; Nobuaki Urasato, Nagano; Hiromi Ohsaki, Niigata; Nichiro Suzuki; Takasi Toide, both of Fukui, all of Japan

[73] Assignee: Shin-Etsu Chemical Co., Ltd., Tokyo, Japan

[21] Appl. No.: 560,389

[22] Filed: Dec. 12, 1983

[51] Int. Cl.$^4$ ............................................. C01B 31/36
[52] U.S. Cl. .................................. 423/345; 75/0.5 B; 75/236; 75/251; 264/56; 264/332; 501/88
[58] Field of Search ...................... 75/0.5 B, 236, 251; 423/345; 264/56, 332; 501/88

[56] References Cited

U.S. PATENT DOCUMENTS

| | | | |
|---|---|---|---|
| 3,836,673 | 9/1974 | Weaver et al. | 75/236 |
| 4,127,411 | 11/1978 | Yajima et al. | 75/236 |
| 4,383,852 | 5/1983 | Yoshizawa | 75/0.5 B |
| 4,484,943 | 11/1984 | Miura et al. | 75/0.5 B |

*Primary Examiner*—Stephen J. Lechert, Jr.
*Attorney, Agent, or Firm*—Hill, Van Santen, Steadman & Simpson

[57] ABSTRACT

The invention provides a method for the preparation of an ultrafine powder of silicon carbide having an extremely fine and uniform particle size distribution of spherical agglomerate particles each formed of crystallites of 5 nm or smaller in size. The silicon carbide powder is prepared by the vapor phase pyrolysis of a specified methyl hydrogen(poly)silane as diluted with a carrier gas, e.g. hydrogen, to give a concentration of 40% by volume or lower at a temperature of 750° to 1600° C. The silicon carbide powder can readily be sintered at a temperature of 1750° to 2500° C. even without addition of a sintering aid to give a sintered body of extremely high density reaching 80% or larger of the theoretical value which can never be obtained of the conventional silicon carbide powders.

3 Claims, 2 Drawing Figures

ULTRAFINE POWDER OF SILICON CARBIDE, A METHOD FOR THE PREPARATION THEREOF AND A SINTERED BODY THEREFROM

BACKGROUND OF THE INVENTION

The present invention relates to an ultrafine powder of silicon carbide, a method for the preparation thereof and a sintered body therefrom. More particularly, the invention relates to an ultrafine powder of silicon carbide composed of spherical agglomerate particles having an average diameter of 0.01 to 1 $\mu$m formed of crystallites of a size of 5 nm or smaller and a method for the preparation of such an ultrafine powder of silicon carbide by the method of vapor phase pyrolysis of a vaporized specific organosilane compound under specific reaction conditions as well as a sintered body obtained from such an ultrafine powder of silicon carbide.

As is well known, silicon carbide is a very promising material having extreme stability against chemical and physical influences and excellent properties such as, in addition to the resistance against oxidation and attack of chemicals, high heat conductivity, low thermal expansion coefficient, high mechanical strengths including hardness so that silicon carbide is used for manufacturing high performance articles such as blades of gas turbines, parts of automobiles, high corrosion-resistant or high heat-resistant refractory parts in chemical plants, electronics materials and the like.

These shaped articles of silicon carbide are usually manufactured by a method of sintering in a variety of processes. Some of the processes in the prior art include (1) a method of reactive sintering or infiltration in which a green body shaped of a powdery mixture of silicon carbide and carbon or a calcined body thereof is brought into contact with molten silicon to infiltrate therethrough so that the molten silicon reacts in situ with the carbon in the shaped body to be converted into silicon carbide, (2) a method of pyrolysis of an organosilicon compound at a high temperature on a suitable substrate of a previously sintered silicon carbide body to deposit silicon carbide as the pyrolysis product thereon and (3) a method by use of a sintering aid in which a fine powder of silicon carbide is admixed with a sintering aid such as metallic aluminum or oxide of aluminum, a combination of carbon and elementary boron and the like and the powdery mixture is shaped into a form and sintered by heating under normal pressure or under a superatmospheric pressure.

A problem in the first mentioned reactive sintering method is that the finished body more or less contains of necessity certain amounts of unreacted silicon so that the sintered body has poor resistance against alkali and relatively low mechanical strengths, especially, at high temperatures. The silicon carbide shaped body obtained by the above mentioned second method is disadvantageous when high mechanical strengths are desired since the vapor phase pyrolysis of the orgnosilicon compound usually cannot reach the depth of the substrate body. Further, the usability of the sintered body of silicon carbide obtained in the third method by use of a sintering aid is naturally limited by the temperature not exceeding the melting point of the sintering aid with great decrease of the mechanical strengths at higher temperatures. In particular, although a sintered body of a relatively high density can be prepared by use of a combination of carbon and elementary boron as a sintering aid, the effective amount of the boron is so large as to sometimes exceed 0.15% by weight so that the silicon carbide sintered body prepared in such a method is quite unsuitable when a high purity is essential as in the articles used in the processing of semiconductor materials due to the presence of free boron on the grain boundaries. This method is of course a good method if the amount of the sintering aid can be greatly decreased if not totally omitted but no powder products of silicon carbide are known hitherto in the art which could be sintered without or with a greatly reduced amount of a sintering aid.

Turning now to the method for the preparation of a silicon carbide powder suitable for sintering, several methods are known in the art. The most basic or traditional method is (1) the pulverization of silicon carbide obtained by the high temperature reaction of elementary silicon and carbon in an electric furnace. Alternatively, methods are known in which (2) a silicon carbide powder is formed by the vapor phase pyrolysis of an organosilane of the formula $R_nSiX_{4-n}$, in which R is a hydrogen atom or an alkyl group, X is a halogen atom and n is an integer of 1 to 4, or a gaseous mixture of the silane with a hydrocarbon compound, (3) a high polymeric polycarbosilane compound is pyrolyzed to form silicon carbide or (4) silicon dioxide is reacted with carbon at a high temperature to form silicon carbide which is then pulverized.

The above mentioned first method is suitable when $\alpha$-type silicon carbide is desired but practically disadvantageous because the method involves the process of pulverization of very hard silicon carbide so that no fine powdery product of high purity can be obtained in a high yield. The second method is disadvantageous, although a relatively fine silicon carbide powder of $\beta$-type can be obtained by the method, due to the very high reaction temperature required for the pyrolysis. In addition, the powdery silicon carbide product obtained by this method necessarily contains a small amount of silicon-bonded halogen atoms which adversely affect of the sintering behavior of the powder if not to mention the problem of the disposal of the hydrogen halide such as hydrogen chloride formed as a byproduct of the reaction. The problems in the third method are the expensiveness of the polycarbosilane compounds and the necessity of the pulverization of the pyrolysis product into a fine powder. The fourth method is also disadvantageous due to the high temperatures required for the reaction and the necessity of the pulverization process. In addition, the silicon carbide product formed by this method always contains unreacted starting materials and elementary silicon as a byproduct so that a purification treatment of the silicon carbide product is indispensable. Furthermore, the particle configuration of the silicon carbide powder obtained by a method involving a pulverization process is naturally not spherical and the particle size distribution thereof is also not uniform so that the sintering behavior of such a pulverized silicon carbide powder is usually not satisfactory.

SUMMARY OF THE INVENTION

It is therefore an object of the present invention to provide a novel and improved powder product of silicon carbide which is suitable for sintering into a shaped body of high strengths and stability without or by use of a very limited amount of a sintering aid.

Another object of the invention is to provide a shaped body of silicon carbide of outstandingly excellent performance of stability and strengths prepared by sintering such an improved powdery product of silicon carbide.

Thus, the powdery product of silicon carbide provided by the present invention is composed of ultrafine polycrystalline agglomerate particles of silicon carbide each having a substantially spherical configuration of 0.01 to 1 μm diameter formed of crystallites of β-type silicon carbide with a size of not exceeding 5 nm.

The above mentioned ultrafine powder of silicon carbide of the invention can be prepared by a method of vapor phase pyrolysis of a vaporized organosilicon compound which is an methylhydrogen(poly)silane represented by the general formula $(CH_3)_a Si_b H_c$, in which the suffix b is 1, 2 or 3 and the suffixes a and c are related to b by the set of equations and inequalities $2b+1 \geq a$, $a \geq b$, $2b+1 \geq c \geq 1$ and $a+c=2b+2$, diluted with a carrier gas to a concentration of 40% by volume or lower in the gaseous mixture at a temperature in the range from 750° to 1600° C.

The above described ultrafine powder of silicon carbide is very susceptible to sintering even without the use of any sintering aid so that a very dense sintered body of silicon carbide having high stability and strengths can be obtained by sintering the ultrafine silicon carbide powder in an atmosphere of an inert gas at a temperature in the range from 1750° to 2500° C.

DETAILED DESCRIPTION OF THE PREFERRED EMBODIMENTS

As is mentioned above, the principle of the inventive method for the preparation of an ultrafine powder of silicon carbide having excellent susceptibility to sintering is the vapor phase pyrolysis of an organosilicon compound and the method has been established as a result of the extensive investigations of the inventors in this direction resulting in the discovery that a quite satisfactory ultrafine powder of silicon carbide can be obtained only when a specific organosilicon compound is pyrolyzed under very specific conditions of the reaction.

Thus, the starting organosilicon compound to be pyrolyzed is a methylhydrogen(poly)silane represented by the general formula $(CH_3)_a Si_b H_c$, in which the suffix b is 1, 2 or 3 and the suffixes a and c are related to b by the set of equations and inequalities $2b+1 \geq a$, $a \geq b$, $2b+1 \geq c \geq 1$ and $a+c=2b+2$.

Several of the examples of such methylhydrogen(poly)silanes include, denoting a methyl group with a symbol Me, methylsilane, MeSiH$_3$, dimethylsilane Me$_2$SiH$_2$, trimethylsilane Me$_3$SiH, 1,2-dimethyldisilane MeH$_2$Si.SiH$_2$Me, 1,1,2,2-tetramethyldisilane Me$_2$HSi.SiHMe$_2$, 1,1,2,3,3-pentamethyltrisilane Me$_2$HSi.SiHME.SiHMe$_2$, 1,1,2,2,3,3-hexamethyltrisilane Me$_2$HSi.SiMe$_2$.SiHMe$_2$ and the like. These (poly)silanes are used either singly or as a mixture of two kinds or more according to need. These methylhydrogen(poly)silanes are obtained either by the pyrolysis reaction of a polydimethylsilane at a temperature of 350° C. or higher or by the dehydrochlorinating reduction of methylchlorodisilanes formed as a byproduct in the direct synthesis of methylchlorosilanes by the reaction of elementary silicon and methyl chloride.

The method of the invention is performed by pyrolyzing a vapor of the above named (poly)silane compound diluted with a suitable carrier gas at a specified temperature. Thus, the vapor of the starting (poly)silane compound is diluted with a carrier gas and the gaseous mixture is introduced into a reactor tube held upright or horizontally and kept at a temperature in the range from 750° to 1600° C. The concentration of the (poly)silane vapor in the gaseous mixture with the carrier gas should be 40% by volume or lower or, preferably, 30% by volume or lower in order to ensure fineness and good sintering behavior of the silicon carbide particles obtained in a good yield. A higher concentration of the (poly)silane vapor in the gaseous mixture is undesirable not only by the decreased yield of the silicon carbide powder due to the deposition on the reactor walls but also by the larger size of the silicon carbide crystallites and broader particle size distribution badly affecting the sintering behavior of the silicon carbide powder. On the other hand, the concentration of the starting (poly)silane compound in the gaseous mixture has no particular lower limit from the standpoint of increasing the fineness of the resultant silicon carbide powder. It is of course, however, that a too low concentration thereof is undesirable due to the unduly low productivity so that the lower limit may be 0.2% by volume or, preferably, 1% by volume.

The temperature of the vapor phase pyrolysis should be in the range from 750° to 1600° C. or, preferably, from 800° to 1500° C. because the velocity of the pyrolysis reaction rapidly decreases below 750° C. to form an oily polymeric material deposited on the reactor walls with a greatly decreased yield of the desired silicon carbide powder while the methane produced by the pyrolysis of the (poly)silane compound is rapidly decomposed at a temperature higher than 1600° C. to liberate free carbon intermixing with the silicon carbide product as an impurity.

The carrier gas or the diluent gas with which the starting (poly)silane vapor is diluted to give a concentration of 40% by volume or lower may be hydrogen gas, helium, argon, nitrogen and the like inert gases or a mixture thereof. A preferable diluent is hydrogen gas or a gaseous mixture of hydrogen with other inert gases such as helium, argon and nitrogen.

When the vapor phase pyrolysis reaction of the (poly)silane compound is carried out in the above described conditions, a very fine powder of silicon carbide is obtained as a reaction product. This product is an ultrafine powder of the β-type silicon carbide composed of substantially spherical agglomerate particles of 0.01 to 1 μm diameter with a very narrow particle size distribution, each particle being composed of crystallites of silicon carbide of 5 nm or smaller in size. These parameters of the particle size and the distribution thereof can be freely controlled by suitably selecting the reaction conditions such as the type of the starting (poly)silane compound, concentration thereof in the gaseous mixture, reaction temperature and others.

Such a morphological conditions of the powder can be confirmed by the examination with an electron microscope either by the photographic method of bright background or by the photographic method of dark background taken with the diffraction on the (111) plane of the β-SiC crystallites. Therefore, this ultrafine powder of silicon carbide obtained in the above described manner is expected to be highly susceptible to sintering even without pulverization and without or with little addition of a sintering aid.

In addition, the thus obtained silicon carbide powder has a very high chemical purity since the starting methylhydrogen(poly)silane compounds can be purified to an extremely high purity of any desired degree by the techniques of distillation. This condition of high purity of the silicon carbide powder ensures, along with the omission of the process of pulverization with a chance of introducing impurities, the high purity of the sintered body of silicon carbide prepared thereof.

The unexpectedly high susceptibility to sintering of the inventive silicon carbide powder may be partly due to the facts, along with the above described favorable morphological conditions of the silicon carbide particles, that the activity of the surface of the silicon carbide particles as formed by the pyrolysis reaction is retained because the surface is never contacted with an active reactant such as hydrogen chloride as a result of the absence of chlorine atoms in the starting (poly)silane compound different from the organochlorosilanes used in the conventional pyrolysis methods and that the pyrolysis reaction of such a methylhydrogen(poly)silane compound can proceed at a much lower temperature without decreasing the surface activity than in the conventional methods.

The ultrafine silicon carbide powder obtained in the above described manner can readily be sintered into a shaped body of high-purity silicon carbide by first shaping the powder into a green body which is then heated under normal pressure or a superatmospheric pressure at a temperature specified above.

The method for shaping the silicon carbide powder of the invention into a body may be a conventional one usually undertaken in the ceramics industry, for example, by use of a die press. The shaping of the inventive silicon carbide powder may be carried out without addition of any additives such as a binder but it is optional to admix a lubricant such as stearic acid or a metal salt thereof, if necessary, dissolved in an organic solvent such as benzene. More complicated forms of the shaped body, such as tubes, crucibles and the like, can be fabricated by use of a rubber press. The shaped body may be imparted with higher precision of the dimensions by mechanically working, e.g. grinding, the green body before sintering. Alternatively, the technique of slip casting is also applicable to the inventive silicon carbide powder for shaping. In this case, the powder is dispersed in water with admixture of a suitable plasticizer such as ethyleneglycol, cellulose derivatives of a relatively low molecular weight, paraffins and the like and a binder such as a polyvinyl butyral and the like and the aqueous dispersion of the powder is cast into a mold of, for example, calcined gypsum. In addition, the techniques of extrusion molding, injection molding, calendering and the like can of course be applied if a msss having a suitable plasticity can be obtained of the inventive silicon carbide powder with admixture of suitable additives.

The thus shaped green body of the inventive silicon carbide powder is then subjected to sintering by heating at a temperature in the range from 1750° to 2500° C. under normal pressure or a superatmospheric pressure. Although the temperature should be as high as possible from the standpoint of ensuring the completeness of sintering with incomplete sintering at a temperature lower than 1750° C., the upper limit 2500° C. of the sintering temperature is given in consideration of the fact that excessive growth of the silicon carbide particles may result in a decreased mechanical strength of the sintered silicon carbide body as a consequence.

The process of sintering should be performed in an atmosphere of an inert gas such as helium, argon, nitrogen and the like. When the shaped body before sintering is subjected to mechanical working as is mentioned above, it is preferable that the shaped body of the silicon carbide powder is calcined in advance before sintering in order to increase the mechanical workability by heating at a temperature of 1500° C. or below depending on the conditions of the mechanical working.

Although the inventive ultrafine powder of silicon carbide as such can be processed into a shaped and sintered body in the above described manner, a more economical way of obtaining a sintered body of silicon carbide by use of the inventive ultrafine powder is the combined use of the inventive silicon carbide powder with a commercially available silicon carbide powder having a relatively small, though coarser than the inventive powder, particle size of, for example, 5 $\mu$m or smaller in the average particle diameter in view of the relative expensiveness of the silicon carbide powder obtained according to the invention. In such a case of the combined use of a relatively coarse silicon carbide powder as is available on the market, it is a preferable way to use a sintering aid as is mentioned before the prior art methods. For example, a combination of elementary boron or a boron compound and carbon in amounts of 0.15 to 5% by weight and 0.1 to 5% by weight, respectively, based on the powder mixture of the silicon carbide is suitable for the purpose, the carbon serving as a deoxidizer to remove the oxygen contained in the starting powder mixture. Even the minimum amounts of 0.15% by weight and 0.10% by weight of the elementary boron and carbon, respectively, as a sintering aid are sufficient for a powder mixture of silicon carbide composed of 50 to 100 parts by weight of the inventive ultrafine powder and 50 parts by weight of a coarser powder available on the market while the amount of the sintering aid can naturally be decreased with the decrease in the relative amount of the coarser silicon carbide powder so that the disadvantages accompanying the use of such a sintering aid can be minimized. The carbon component in the sintering aid as combined with boron may be replaced by an organic polymer compound with some improvements in the dispersibility in the powder mixture. Other conventional sintering aids such as a metal or a metal oxide can of course be used in this case and the amount thereof can be greatly reduced by virtue of the much better susceptibility to sintering of the inventive ultrafine silicon carbide powder.

The conditions for the shaping and sintering of the powder mixture including a commercially available coarser powder may be about the same as in the case for the fabrication with the inventive silicon carbide powder alone although it is preferable that the sintering temperature should be in the range from 1800° to 2500° C. in view of the lesser surface activity of the coarser powder to sintering requiring higher sintering temperatures.

In short, the ultrafine silicon carbide powder of the invention can readily give, when adequately processed, a shaped and sintered body having a density of 2.4 g/cm$^3$ or larger or 75% or larger of the theoretical density of silicon carbide. Such a high density sintered body of silicon carbide has extremely high mechanical strengths and stability so that various kinds of high-performance articles working under very severe conditions, such as the blades of gas turbines and automobile parts, can be prepared according to the invention in addition to other articles of variety requiring no particularly high strength but high purity, such as the substrate plates for ICs, LSIs and the like and reactor tubes for high purity chemicals.

In the following, the present invention is described in further detail by way of examples.

EXAMPLE 1

An alumina-made reactor tube having an inner diameter of 52 mm and a length of 1000 mm was held in a horizontal disposition and heated in a tubular electric furnace at 1150° C. around the center portion thereof and a gaseous mixture composed of 3% by volume of a vapor of 1,1,2,2-tetramethyldisilane and 97% by volume of hydrogen was continuously introduced thereinto for 8 hours at a rate of 400 ml/minute to effect pyrolysis of the disilane compound so that 15.5 g of a brown powder of silicon carbide were obtained. The yield was about 75% of the calculated value.

The results of chemical analysis undertaken for this powder indicated a high purity of the silicon carbide product with the contents of silicon and carbon of 69.9% and 29.4%, respectively, and the emission spectrographic analysis indicated that the content of each of the impurity elements Al, Cr, Cu, Fe, Mg, Mn, Ni, Ti and V was 10 p.p.m. or smaller.

Electron microscopic examination of the thus obtained ultrafine powder of silicon carbide by the techniques of the bright background electron microphotography and the dark background electron microphotography taken with the diffraction on the (111) planes of the $\beta$-SiC crystallites for the same visual field as in the bright background photography indicated that the powder was composed of substantially spherical agglomerate particles of 0.1 to 0.2 $\mu$m diameter, each particle being formed of $\beta$-SiC crystallites of 5 nm or smaller in size. It was shown further by the analysis with a centrifugal analyzer for particle size distribution that the powder contained no particles coarser than 0.5 $\mu$m and finer than 0.08 $\mu$m in diameter and 88.3% by weight of the powder was composed of particles of diameter in the range from 0.1 to 0.3 $\mu$m.

Figure 1:
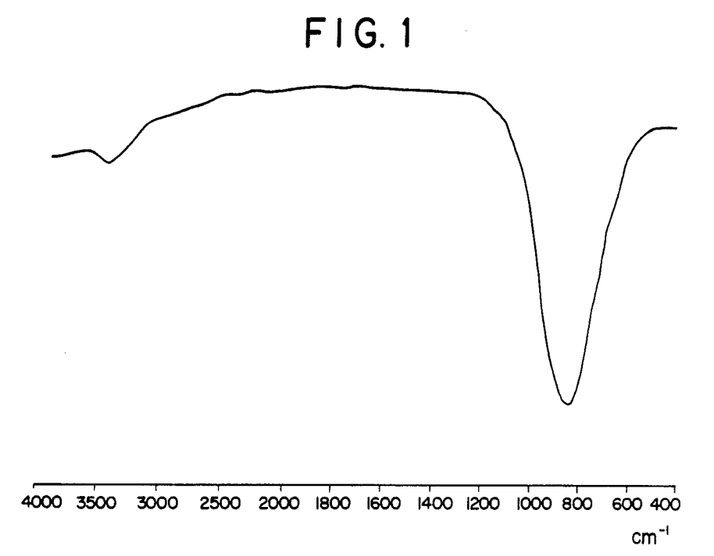
FIG. 1 is an infrared absorption spectrum of an ultrafine powder of silicon carbide of the invention taken by the KBr tablet method.
Figure 2:
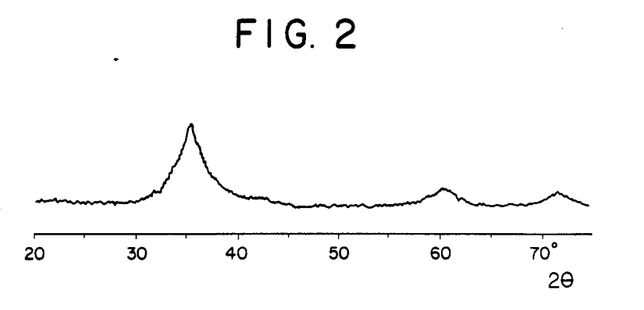
FIG. 2 is an X-ray diffraction diagram of the same ultrafine powder of silicon carbide.

The specific surface area of the powder determined by the BET method was 26.8 $m^2/g$ and the X-ray diffractometry of the powder gave a diagram shown in FIG. 2 which evidenced that the crystallographic form of the powder was $\beta$-SiC. FIG. 1 is an infrared absorption spectrum of the powder taken by the KBr tablet method.

The above obtained silicon carbide powder was taken in a carbon mold of 40 mm diameter for hot press without addition of any sintering aid and, after deaeration under a reduced pressure, sintering of the powder was performed in an atmosphere of argon at a temperature of 2000° C. for 50 minutes with compression under a pressure of 200 kg/$cm^2$. The thus obtained sintered body had a density of 3.07 g/$cm^3$ or about 95.3% of the theoretical density of 3.22 g/$cm^3$ to indicate the excellent susceptibility of the powder to sintering.

For comparison, a commercially available high-purity $\beta$-type, fine grade silicon carbide powder manufactured by Ibiden Co., Japan, was examined in the same manner as above. The results were that: the average particle diameter was 0.4 $\mu$m; the specific surface area was 18.6 $m^2/g$; the contents of metallic impurities of Al, Cr, Cu, Fe, Mg, Mn, Ni, Ti and V were 450 p.p.m., 100 p.p.m., less than 10 p.p.m., 500 p.p.m., 30 p.p.m., less than 5 p.p.m., 190 p.p.m., 300 p.p.m. and 370 p.p.m., respectively. The electron microscopic examination indicated that the configuration of the particles was not spherical and the uniformity of the particle size distribution was low.

EXAMPLE 2 (Experiments No. 2 to No. 8)

The experimental procedure in each of these Experiments was substantially the same as in Example 1 except that a modification was made in the concentration of the disilane vapor in the gaseous feed. Further, the carrier gas was a mixture of hydrogen and argon in a volume ratio of 1:1 or 1:2 in Experiments No. 6 and No. 7, respectively, the carrier gas in the other Experiments being pure hydrogen. Experiment No. 8 was undertaken for comparative purpose by increasing the concentration of the disilane vapor to 45% by volume in the gaseous feed. In this comparative experiment, the reaction was discontinued after 4 hours from the start of the reaction and it was found that the inner wall of the reactor tube was covered with a thick layer of silicon carbide powder deposited thereon and the reactor tube was destroyed on the way of cooling.

Table 1 below summarizes the concentrations of the disilane vapor in the gaseous feed, yields of the silicon carbide powders in g and in % of the theoretical value, crystallite size, ranges of the diameter of the agglomerate particles, specific surface areas, results of the chemical analysis for silicon and carbon and volume resistivities of the sintered bodies.

EXAMPLE 3 (Experiments No. 9 to No. 21)

TABLE 1

| Experiment No. | | 2 | 3 | 4 | 5 | 6 | 7 | 8 |
|---|---|---|---|---|---|---|---|---|
| Concentration of disilane vapor, % by volume | | 25 | 10 | 5 | 2 | 8 | 3 | 45 |
| Yield | g | 133.7 | 51.1 | 25.0 | 9.5 | 40.8 | 14.7 | 72.0 |
| | % | 78.0 | 74.5 | 72.9 | 70.1 | 74.3 | 71.5 | 52.0 |
| Size of crystallites, nm, less than | | 2 | 2 | 1.5 | 1 | 1.5 | 1 | — |
| Diameter range of agglomerate particles, $\mu$m | | 0.8– 0.9 | 0.5– 0.6 | 0.2– 0.3 | 0.05– 0.1 | 0.4– 0.5 | 0.1– 0.2 | 0.5– 2.5 |
| Specific surface area, $m^2/g$ | | 8.2 | 13.9 | 23.6 | 40.6 | 15.6 | 28.6 | 6.3 |
| Chemical analysis, % | Si | 69.4 | 70.1 | 69.8 | 70.2 | 69.6 | 68.9 | 69.6 |
| | C | 29.6 | 29.6 | 29.5 | 29.3 | 29.5 | 29.7 | 30.2 |

TABLE 1-continued

| Experiment No. | 2 | 3 | 4 | 5 | 6 | 7 | 8 |
|---|---|---|---|---|---|---|---|
| Volume resistivity, ohm · cm | $1.0 \times 10^{-1}$ | $2.2 \times 10^{2}$ | $1.1 \times 10^{4}$ | $2.1 \times 10^{7}$ | $6.5 \times 10^{2}$ | $8.6 \times 10^{3}$ | — |

A similar experimental procedure for Example 1 was undertaken in these Experiments with different kinds of the starting (poly)silane compounds, concentrations thereof in the gaseous feed, carrier gases and the mixing ratios thereof when two kinds of gases were used in combination, rates of carrier gas introduction, reaction temperatures and reaction times as shown in Table 2 below which also includes the yields of the silicon carbide powder in g and in % of the respective theoretical values. In Table 2, the starting (poly)silane compounds are denoted as I, II, III, IV and V in place of the respective chemical names of: dimethylsilane; trimethylsilane; 1,1,2,2-tetramethyldisilane; 1,2-dimethyldisilane; and 1,1,2,3,3-pentamethyltrisilane, respectively.

Further, examination of these silicon carbide powders was performed in the same manner as in Examples 1 and 2 to give the results shown in Table 3 below. It was noted that the infrared absorption spectra of the powders obtained in Expriments No. 11 and No. 15 indicated the presence of a trace amount of the silicon-bonded hydrogen atoms. For comparison, the silicon carbide powder obtained in Experiment No. 8 of the preceding example was processed into a sintered body in the same manner. The density of this sintered body was only 71.2% of the theoretical value.

EXAMPLE 4

An alumina-made reactor tube having an inner diameter of 52 mm and a length of 1000 mm was held upright and heated in a tubular electric furnace at 1350° C. and a gaseous mixture composed of 2% by volume of a vapor of 1,1,2,2-tetramethyldisilane and 98% by volume of hydrogen was continuously introduced thereinto at a rate of 300 ml/minute together with nitrogen gas at a rate of 100 ml/minute to effect pyrolysis of the disilane compound into a silicon carbide powder which had a specific surface area of 37.3 m²/g.

TABLE 2

| Exp. No. | Silane Compound | Concentration, % by volume | Carrier gas Gases (volume ratio) | Feed rate, ml/minute | Reaction temperature, °C. | Reaction time, hours | Yield g | Yield % |
|---|---|---|---|---|---|---|---|---|
| 9 | I | 15 | H₂ | 600 | 1150 | 6 | 43.2 | 74.6 |
| 10 | I | 10 | H₂ + Ar (2:1) | 800 | 1450 | 6 | 38.0 | 73.5 |
| 11 | I | 2 | H₂ + N₂ (1:2) | 800 | 820 | 10 | 12.7 | 74.1 |
| 12 | II | 5 | H₂ + Ar (2:1) | 800 | 1230 | 8 | 25.3 | 73.8 |
| 13 | III | 10 | H₂ | 600 | 1250 | 6 | 58.6 | 76.0 |
| 14 | III | 2 | H₂ + Ar (3:1) | 600 | 980 | 10 | 18.8 | 73.2 |
| 15 | III | 5 | H₂ + N₂ (1:1) | 400 | 800 | 8 | 26.3 | 76.7 |
| 16 | III | 5 | H₂ + N₂ (1:9) | 400 | 1100 | 8 | 25.9 | 75.5 |
| 17 | IV | 5 | H₂ + Ar (1:1) | 400 | 1180 | 5 | 16.5 | 77.1 |
| 18 | IV | 5 | H₂ + N₂ (1:1) | 400 | 920 | 5 | 16.3 | 76.2 |
| 19 | IV | 8 | H₂ | 400 | 1050 | 5 | 26.4 | 76.9 |
| 20 | V | 3 | N₂ | 400 | 1250 | 8 | 24.4 | 79.1 |
| 21 | V | 3 | H₂ | 400 | 1230 | 8 | 24.4 | 79.1 |

TABLE 3

| Exp. No. | Crystallite size, nm, less than | Particle diameter, μm | Specific surface area, m²/g | Chemical analysis, % Si | Chemical analysis, % C | Volume resistivity of powder, ohm · cm | Density of sintered body, % of theoretical |
|---|---|---|---|---|---|---|---|
| 9 | 2 | 0.7–0.8 | 10.5 | 69.5 | 29.7 | $2.8 \times 10^{2}$ | 79.3 |
| 10 | 4 | 0.5–0.6 | 15.3 | 69.6 | 30.1 | $9.2 \times 10^{2}$ | 82.0 |
| 11 | 1.5 | 0.03–0.1 | 41.0 | 67.3 | 30.3 | $3.6 \times 10^{9}$ | 90.2 |
| 12 | 2 | 0.1–0.2 | 26.7 | 68.9 | 30.6 | $5.0 \times 10^{4}$ | 90.1 |
| 13 | 3 | 0.4–0.5 | 16.7 | 69.8 | 30.0 | $1.2 \times 10^{3}$ | 87.6 |
| 14 | 1.5 | 0.05–0.08 | 32.1 | 69.6 | 30.2 | $4.2 \times 10^{8}$ | 92.0 |
| 15 | 1 | 0.1–0.15 | 28.2 | 69.6 | 30.2 | $3.0 \times 10^{6}$ | 89.7 |
| 16 | 2 | 0.07–0.5 | 26.3 | 69.7 | 29.9 | — | 87.7 |
| 17 | 2 | 0.1–0.2 | 25.4 | 70.0 | 29.8 | $2.0 \times 10^{6}$ | 90.3 |
| 18 | 1.5 | 0.1–0.5 | 28.6 | 69.9 | 30.3 | — | 86.5 |
| 19 | 1.5 | 0.2–0.3 | 20.0 | 69.9 | 29.9 | $1.8 \times 10^{4}$ | 87.7 |
| 20 | 3 | 0.1–0.9 | 18.6 | 68.8 | 30.5 | $1.8 \times 10^{4}$ | 86.5 |
| 21 | 2 | 0.3–0.4 | 18.6 | 68.8 | 30.5 | — | 89.7 |

Electron microscopic examination of the thus obtained ultrafine powder of silicon carbide undertaken in the same manner as in Example 1 indicated that the powder was composed of agglomerate particles of 0.1 to 0.3 μm diameter, each particle being formed of β-SiC crystallites of 4 nm or smaller in size.

The above obtained silicon carbide powder in an amount of 15 g was taken in a carbon mold of 40 mm diameter for hot press without addition of any sintering aid and, after degassing under a reduced pressure, sintering of the powder was performed in an atmosphere of argon at a temperature of 2300° C. for 30 minutes under compression with a pressure of 100 kg/cm². The sintered body thus obtained and taken out of the mold after cooling had a density of 3.00 g/m³ corresponding to 93% of the theoretical desnity. The volume resistivity of this sintered body was 10³ ohm·cm. The electron microscopic examination of the surface of this sintered body indicated no particularly gross grains formed by the grain growth of low uniformity in the course of sintering.

The above obtained silicon carbide powder (hereinafter referred to as μ-SiC) was subjected to sintering without or with addition of a sintering aid which was boron nitride (BN), boron carbide (B₄C), elementary boron (B) or a combination of elementary boron and a phenolic resin giving 55% of carbon by carbonization (B/C) at a temperature of 1800° to 2300° C. under an atmosphere of argon or nitrogen by use of a hot press or by sintering under normal pressure. The conditions of sintering as well as the densities of the thus obtained sintered bodies of silicon carbide in g/cm³ or in % of the theoretical density are summarized in Table 4.

For comparison, a commercially available β-type silicon carbide powder having a specific surface area of 16 m²/g (a product by Ibiden Co., Japan, referred to as β-SiC) and a commercially available β-type silicon carbide powder having specific surface area of 11 m²/g (a product by Showa Denko Co., Japan, referred to as β-SiC) were subjected to the sintering test in a similar manner. The sintering conditions and the densities of the sintered bodies obtained in these comparative tests are also included in Table 4 below.

EXAMPLE 5

The experimental conditions for the preparation of the silicon carbide powder were substantially the same as in the preceding example except that the temperature of the reactor tube was kept at 1050° C. and a feed gas composed of 10% by volume of 1,1,2,2-tetramethyldisilane and 90% by volume of hydrogen was introduced thereinto at a rate of 400 ml/minute.

The resultant silicon carbide powder had a specific surface area of 14.2 m²/g and was composed of agglomerate particles of 0.5 to 0.6 μm diameter, each particle being formed of crystallites of 5 nm or smaller in size.

The thus obtained silicon carbide powder was sintered in the same manner as in the preceding example at 1900° C. for 30 minutes under a pressure of 100 kg/cm² to give a sintered body having a density of 2.96 g/cm³ or 92% of the theoretical density.

For comparison, the same sintering procedure as above was tried by use of a commercially available β-type silicon carbide powder (β-SiC) alone in place of the silicon carbide powder obtained according to the inventive method but the density of the sintered body was only 1.80 g/cm³ with very low mechanical strengths.

EXAMPLE 6

A powder mixture composed of 5 g of the silicon carbide powder obtained in Example 4 (μ-SiC), 5 g of the commercially available β-type silicon carbide powder used in Example 4, 0.015 g of elementary boron, 0.019 g of the same phenolic resin as used in Example 4 and 70 g of hexane was uniformly blended for 24 hours in a polyethylene-made ballmill followed by evaporation of the solvent to dryness and disintegration into a powder form.

The above prepared powdery mixture was shaped by compression molding in a metal mold into a rod-like form of 40 mm by 50 mm by 450 mm, which was then compressed by use of a rubber press under a pressure of 1.5 tons/cm² followed by the carbonization treatment of the phenolic resin in an atmosphere of nitrogen at 800° C. for 1 hour. The thus treated shaped body having a density of 1.57 g/cm³ was placed in a carbon die and sintered by hot-pressing for 1 hour at 2000° C. in an atmosphere of argon. The sintered body had a density of 2.63 g/cm³ or 82% of the theoretical value and a volume resistivity of 10⁶ ohm·cm.

The same experimental procedure as above was repeated by varying the proportion of the μ-SiC and the β-type silicon carbide or by replacing the β-type silicon carbide with the α-type silicon carbide powder (α-SiC) used in Example 4 and by varying the amounts of the boron and the phenolic resin as the sintering aid. The results are shown in Table 5 below.

EXAMPLE 7

The same procedure for the preparation of a silicon carbide powder as in Example 4 was repeated excepting that the tetramethyldisilane in Example 4 was placed with dimethylsilane to give an ultrafine silicon carbide powder having a specific surface area of 43.9 m²/g and composed of agglomerate particles of 0.2 to 0.8 μm diameter, each particle being formed of crystallites of 4 nm or smaller in size.

TABLE 4

| Exp. No. | SiC powder | Additive (% by weight) | Sintering conditions | | | | Density | |
|---|---|---|---|---|---|---|---|---|
| | | | Hot press (kg/cm²) | Temperature, °C. | Time, minutes | Atmosphere | g/cm³ | % of theoretical |
| 1 | μ-SiC | none | yes (100) | 2300 | 30 | Ar | 3.00 | 94 |
| 2 | | none | yes (100) | 1800 | 30 | Ar | 2.75 | 86 |
| 3 | | none | yes (200) | 2100 | 50 | N₂ | 2.90 | 91 |
| 4 | | none | no | 2300 | 50 | N₂ | 2.45 | 77 |
| 5 | | BN (0.07) | yes (200) | 2300 | 50 | Ar | 3.08 | 96 |
| 6 | | B₄C (0.07) | yes (200) | 2300 | 50 | Ar | 3.16 | 99 |
| 7 | | BN (0.07) | no | 2300 | 50 | N₂ | 2.85 | 89 |
| 8 | | B (0.07) | no | 2300 | 50 | N₂ | 2.90 | 91 |
| 9 | | B/C (0.05/0.05) | no | 2300 | 50 | N₂ | 2.94 | 92 |
| 10 | β-SiC | none | yes (200) | 2100 | 50 | Ar | 2.17 | 68 |
| 11 | | B₄C (0.5) | yes (200) | 2100 | 50 | Ar | 2.35 | 73 |
| 12 | | none | no | 2100 | 60 | N₂ | 1.88 | 59 |
| 13 | | B/C (0.1/0.1) | no | 2100 | 60 | N₂ | 1.82 | 57 |
| 14 | α-SiC | none | yes (200) | 2100 | 50 | Ar | 2.10 | 66 |
| 15 | | B/C (0.1/0.1) | no | 2100 | 50 | Ar | 1.92 | 60 |

Experiments No. 10 to No. 15 are for comparative purpose. See text.

TABLE 5

| Formulation | | | Density of sintered body | |
|---|---|---|---|---|
| Silicon carbide powders, mixing ratio by weight | Boron added, % by weight | Phenolic resin added, % by weight | g/cm³ | % of theoretical |
| μ-SiC:β-SiC = 8:2 | 0.15 | 0.07 | 2.74 | 85 |
| μ-SiC:β-SiC = 8:2 | 0.15 | 0.10 | 2.80 | 87 |
| μ-SiC:α-SiC = 8:2 | 0.15 | 0.10 | 3.02 | 94 |
| μ-SiC:α-SiC = 5:5 | 0.10 | 0.10 | 2.59 | 81 |

Thirty grams of the powder was blended with a solution prepared by dissolving 1 g of methylcellulose (MC-400, a product by Shin-Etsu Chemical Co., Japan) and 1 g of glycerin in 6 g of water and the mixture was milled in a three-roller mill and shaped into a sheet-like form of 2 mm thickness. A 50 mm by 50 mm wide piece of a sheet taken by cutting from the above sheet was calcined at 1200° C. for 1 hour in an atmosphere of nitrogen and then sintered by heating at 2300° C. for 1 hour also in an atmosphere of nitrogen. The resultant sheet had a density of 2.65 g/cm³ or 83% of the theoretical density.

What is claimed is:

1. A method for preparation of a silicon carbide powder composed of polycrystalline agglomerate particles of silicon carbide each having a substantially spherical configuration of 0.01 to 1 μm diameter and formed of crystallites of β-type silicon carbide with a size of not exceeding 5 nm which comprises pyrolyzing, in a vapor phase, a methyl hydrogen(poly)silane compound represented by the general formula $(CH_3)_a Si_b H_c$, in which the suffix b is 1, 2 or 3 and the suffixes a and c are related to b by the set of equations and inequalities $2b+1 \geq a$, $a \geq b$, $2b+1 \geq c \geq 1$ and $a+c = 2b+2$, diluted with a carrier gas to a concentration in the range from 0.2 to 40% by volume in the gaseous mixture at a temperature in the range from 750° to 1600° C.

2. The method as claimed in claim 1 wherein the carrier gas is hydrogen or a gaseous mixture of hydrogen with nitrogen, argon or helium.

3. The method as claimed in claim 1 wherein the methyl hydrogen(poly)silane is selected from the group consisting of methylsilane $MeSiH_3$, dimethylsilane $Me_2SiH_2$, trimethylsilane $Me_3SiH$, 1,2-dimethyldisilane, $MeH_2Si.SiH_2Me$, 1,1,2,2-tetramethyldisilane $Me_2HSi.SiHMe_2$, 1,1,2,3,3-pentamethyltrisilane $Me_2HSi.SiHMe.SiHMe_2$ and 1,1,2,2,3,3-hexamethyltrisilane $Me_2HSi.SiMe_2.SiHMe_2$, the symbol Me denoting a methyl group.

* * * * *

REEXAMINATION CERTIFICATE (928th)
United States Patent [19]
Endou et al.

[11] B1 4,571,331

[45] Certificate Issued Sep. 27, 1988

[54] ULTRAFINE POWDER OF SILICON CARBIDE, A METHOD FOR THE PREPARATION THEREOF AND A SINTERED BODY THEREFROM

[75] Inventors: Morinobu Endou, Nagano; Minoru Takamizawa, Tokyo; Tatsuhiko Hongu, Kanagawa; Taishi Kobayashi; Akira Hayashida, both of Niigata; Nobuaki Urasato, Nagano; Hiromi Ohsaki, Niigata; Nichiro Suzuki; Takasi Toide, both of Fukui, all of Japan

[73] Assignee: Shin-Etsu Chemical Co., Ltd., Tokyo, Japan

Reexamination Request:
No. 90/001,244, May 21, 1987

Reexamination Certificate for:
Patent No.: 4,571,331
Issued: Feb. 18, 1986
Appl. No.: 560,389
Filed: Dec. 12, 1983

[51] Int. Cl.$^4$ .............................................. C01B 31/36
[52] U.S. Cl. ................................. 423/345; 75/0.5 B; 75/236; 75/251; 264/56; 264/332; 501/88

[56] References Cited
FOREIGN PATENT DOCUMENTS
2744636  5/1979  Fed. Rep. of Germany .

OTHER PUBLICATIONS

Herstellung von Siliciumcarbidpulvern Durch Gasphasenreaktion und Untersuchung des Sinterverhaltens ("Production of Silicon Carbide Powders by Gas Phase Reaction and Investigation of their Sintering Behavior"), Thesis of Wolfgang Boecker for the Degree Doktor-Ingenieur at the Technical University of Berlin, 1979.

Wolfgang Boecker et al., Verfahren zur Herstellung von Silicium-Carbidpulvern Aus der Gasphase ("Process for the Production of Silicon Carbide Powders from the Gaseous Phase"), Ber. Dtsch. Keram. Ges. 55, 233–37 (1978).

*Primary Examiner*—John Doll

[57] ABSTRACT

The invention provides a method for the preparation of an ultrafine powder of silicon carbide having an extremely fine and uniform particle size distribution of spherical agglomerate particles each formed of crystallites of 5 nm or smaller in size. The silicon carbide powder is prepared by the vapor phase pyrolysis of a specified methyl hydrogen(poly)silane as diluted with a carrier gas, e.g. hydrogen, to give a concentration of 40% by volume or lower at a temperature of 750° to 1600° C. The silicon carbide powder can readily be sintered at a temperature of 1750° to 2500° C. even without addition of a sintering aid to give a sintered body of extremely high density reaching 80% or larger of the theoretical value which can never be obtained of the conventional silicon carbide powders.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3 are cancelled.

* * * * *